United States Patent [19]

Kamiyama et al.

[11] Patent Number: 5,303,953
[45] Date of Patent: Apr. 19, 1994

[54] INFLATABLE SEAT BELT APPARATUS

[75] Inventors: Misao Kamiyama; Kazuo Zeze, both of Hikone, Japan

[73] Assignee: Takata Corporation, Tokyo, Japan

[21] Appl. No.: 963,335

[22] Filed: Oct. 19, 1992

[30] Foreign Application Priority Data

Oct. 21, 1991 [JP] Japan .................. 3-272600

[51] Int. Cl.⁵ ............................... B60R 21/18
[52] U.S. Cl. ................................ 280/733; 280/808
[58] Field of Search ............ 280/733, 730 R, 801, 280/808

[56] References Cited

U.S. PATENT DOCUMENTS

3,841,654 10/1974 Lewis ........................ 280/733

FOREIGN PATENT DOCUMENTS

| 0385232 | 9/1990 | European Pat. Off. | 280/801 |
|---------|--------|--------------------|---------|
| 2612137 | 9/1988 | France | 280/808 |
| 0258239 | 10/1988 | Japan | 280/733 |
| 0083436 | 3/1989 | Japan | 280/733 |

*Primary Examiner*—Margaret A. Focarino
*Assistant Examiner*—Paul Dickson
*Attorney, Agent, or Firm*—Armstrong, Westerman, Hattori, McLeland & Naughton

[57] ABSTRACT

Disclosed is an inflatable seat belt apparatus in which, under ordinary conditions, a shoulder belt (2) is maintained in a belt-shaped form and a movable lever (7d) is maintained in contact with a main body (7a) at an opening-area reducing position. Accordingly, the belt (2) is prevented from turning over and twisting so similar to that of the conventional seat belt apparatus. In the event of an emergency such as a vehicular collision, a gas generator (8) is actuated and generates a gas which causes a shoulder belt portion (2a) between the gas generator (8) and the intermediate guide (7) to inflate. The gas which has filled the portion 2(a) of the shoulder belt causes the movable lever (7d) to move to the position at which it enlarges the opening area of the through-hole. Accordingly, the gas easily flows into the shoulder belt (7b) ahead of the intermediate guide (7). Thus, the shoulder belt (7) expands instantaneously and in reliable fashion.

6 Claims, 3 Drawing Sheets

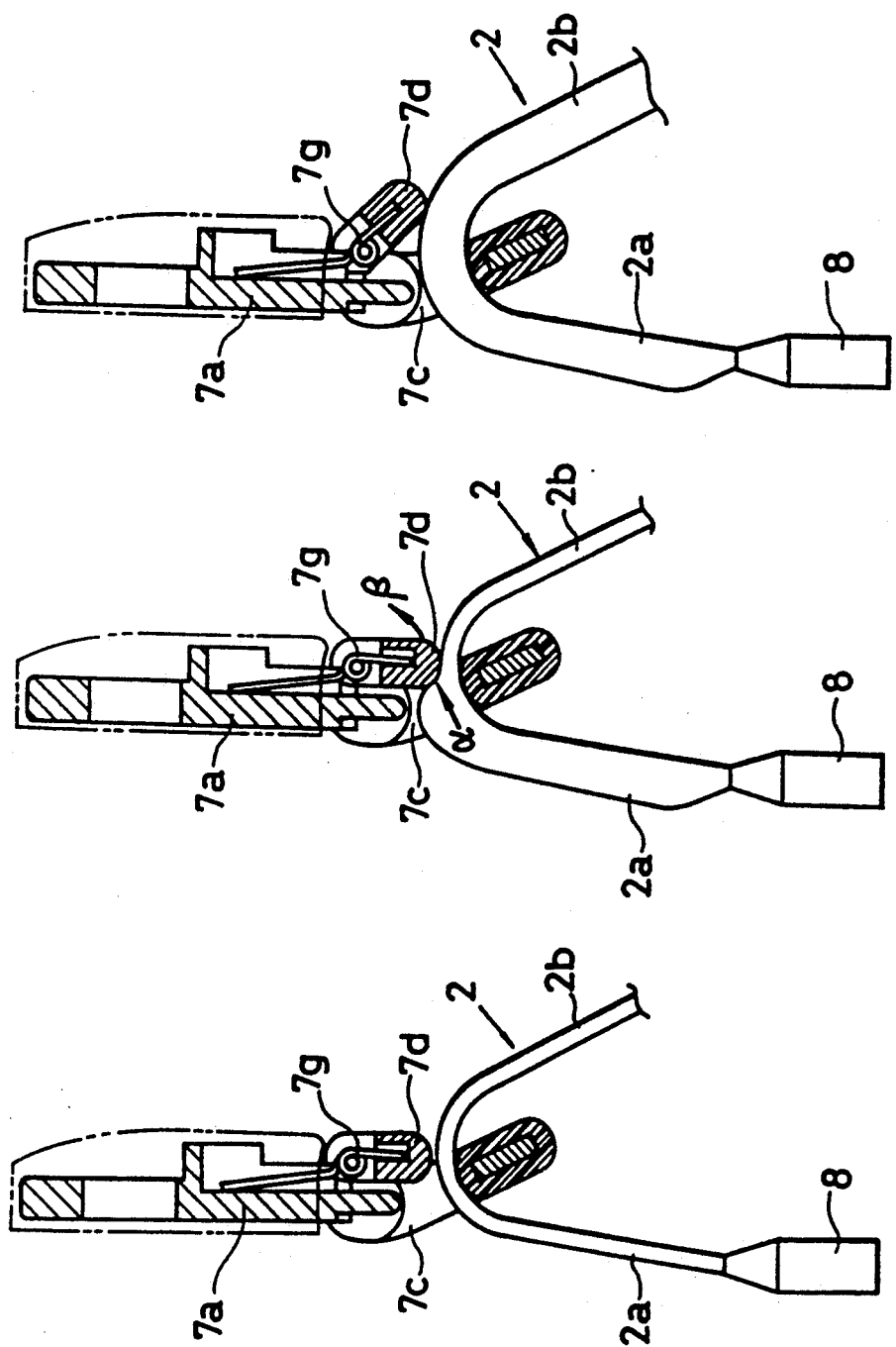

INFLATABLE SEAT BELT APPARATUS

BACKGROUND OF THE INVENTION

This invention relates to an inflatable seat belt apparatus having a webbing at least a portion of which is formed into a bag-like shape, wherein the webbing is maintained in a belt-like form during ordinary conditions and is inflated by gas from gas generating means at the time of an emergency.

The seat of a vehicle such as an automobile often is equipped with a seat belt apparatus. The seat belt apparatus is adapted to restrain a seated passenger by a webbing in the event of an emergency such as a vehicular collision, thereby protecting the passenger against injury caused by a collision. However, in a seat belt apparatus of this kind, the width of the webbing constituting a belt which restrains the passenger cannot be made very large, and, therefore a comparatively large load acts upon the passenger locally when the passenger is restrained by the webbing.

In efforts to solve this problem, inflatable seat belt apparatus have been proposed, as disclosed in the specifications of Japanese Patent Application Laid-Open (KOKAI) Nos. 47-26830 and 49-88220, in which the webbing is formed into the shape of a bag and functions as an ordinary seat belt by being maintained in a belt-like form under ordinary circumstances. In the event of an emergency, a gas emitted from gas generating means is introduced into the bag-shaped webbing, thereby inflating the webbing so that the passenger is restrained by the inflated webbing. In accordance with an inflatable seat belt apparatus of this kind, the webbing receives the kinetic energy of the passenger over a wider area. Since the load is thus dispersed, the load which acts upon the passenger becomes comparatively small and the passenger is protected much more effectively.

When it is attempted to furnish a rear seat with an air bag apparatus of the kind provided in order to protect a passenger in the front seat, the air bag apparatus can only be installed in the front of the rear seat. In a case where an air bag apparatus is provided in the front seat, it is difficult to so arrange it that the air bag apparatus in the rear seat will protect the rear passenger properly and effectively since the position of the front seat differs depending upon whether it is moved forward or backward by the passenger, and since the reclining position of the front seat also differs depending upon the passenger. Accordingly, the above-described inflatable seat belt apparatus is particularly useful in the rear seat.

The conventional common seat belt apparatus comes in various configurations, one of which is a three-point seat belt configuration. In a three-point seat belt apparatus, a tongue is freely slidably provided on a webbing wound up by a retractor. When the seat belt is fastened, the tongue is inserted into and locked with a buckle fixedly connected to the floor of the vehicle body, whereby the webbing engages the shoulder of the passenger and protects the passenger from the left and right sides. In a three-point seat belt apparatus of this kind, it must be so arranged that the webbing restrains the passenger at the correct position.

Accordingly, in the prior art, the webbing extending from the shoulder, namely the shoulder belt, is provided with an intermediate guide supported on the vehicle pillar or the like. The shoulder belt is slidably passed through a belt through-hole in the intermediate guide and the shoulder belt is guided so as to contact the passenger at the correct position.

If the webbing becomes twisted in the intermediate guide of this kind, not only is it impossible to apply the webbing correctly but smooth back-and-forth movement of the webbing through the through-hole of the intermediate guide is impeded as well. Accordingly, it is required that the belt through-hole formed in the intermediate guide be designed to have a size that will not allow the webbing to become twisted. This means that there is a limitation upon the size of the hole and that the hole cannot be made very large.

In the inflatable seat belt apparatus described above, it is desired that the webbing be made to restrain the passenger at the correct position by providing the intermediate guide.

However, as set forth above, there is a limitation upon the size of the belt through-hole in the intermediate guide in order to prevent the turning over and twisting of the webbing which passes through the hole. Consequently, in the case where the inflatable seat belt apparatus is provided with the intermediate guide, the inflation of the webbing is restricted by the intermediate guide when the webbing is inflated by inflow of a gas to the bag-shaped webbing from the gas generating means in the event of an emergency. As a result, the injected gas cannot flow into the webbing smoothly from the location of the intermediate guide, namely into the portion of the webbing in contact with the passenger. As a result, there are instances in which the portion of the webbing contacting the passenger is not inflated rapidly. Accordingly, a case is conceivable in which it is impossible to reliably and fully realize the inflatable seat belt function of reducing the load upon the passenger by having the webbing disperse the load attributable to the kinetic energy of the passenger.

SUMMARY OF THE INVENTION

Accordingly, an object of the present invention is to provide an inflatable seat belt apparatus in which the inflatable webbing can be inflated reliably and rapidly when necessary even if the webbing is guided by an intermediate guide.

According to the present invention, the foregoing object is attained by providing an inflatable seat belt apparatus having a webbing at least part of a portion of which comes into contact with a passenger and is formed into a bag-like shape, wherein the webbing is maintained in a belt-like form during ordinary conditions and the bag-like portion is inflated by gas from a gas generating means at the time of an emergency, and a tongue provided on the webbing is inserted into and locked with a buckle to make possible restraint of the passenger, characterized by comprising an intermediate guide, which has a through-hole through which the webbing is passed, for guiding the webbing passed through the through-hole in a freely movable manner, and a through-hole opening-area control member movably provided on the intermediate guide and held at an opening-area reducing position under ordinary conditions and moved to an opening-area enlarging position in the event of an emergency, wherein when the control member is at the opening-area reducing position it sets the opening area of the through-hole to a size which will allow movement of the webbing therethrough while the webbing is maintained in the belt-like form, but which will impede turning over and twisting of the webbing, and when the control member is at the opening-area enlarging position it enlarges the opening area of the through-hole.

In the inflatable seat belt apparatus according to the invention constructed at set forth above, under ordinary conditions the webbing is maintained in the belt-like form and the through-hole opening-area control member reduces the opening area of the through-hole in the intermediate guide. Accordingly, the webbing is prevented from twisting and turning over in the through-hole of the intermediate guide, and the webbing restrains the passenger at the correct position by virtue of the intermediate guide. Thus, under ordinary conditions, the inflatable seat belt apparatus performs a function similar to that of the common seat belt apparatus of the prior art.

In the event of an emergency, the gas generated by the gas generating means is impelled into the bag-shaped portion of the webbing. At this time, the control member is moved, to the opening-area enlarging position, and, therefore, the opening area of the through-hole in the intermediate guide is enlarged. As a result, the gas can readily penetrate the bag-shaped portion of the webbing. Accordingly, the webbing is inflated instantaneously and in a reliable fashion so that the passenger is reliably restrained by the inflated webbing. Consequently, the restraining portion of the webbing that acts upon the passenger broadens so that the kinetic energy of the passenger is received over a wide area. This means that the load is dispersed so that the passenger is protected from large impact loads much more reliably.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIGS. 4(a), 4(b), and 4(c) diagrammatically illustrate the operation of this embodiment.

DESCRIPTION OF THE PREFERRED EMBODIMENT

Figure 1:
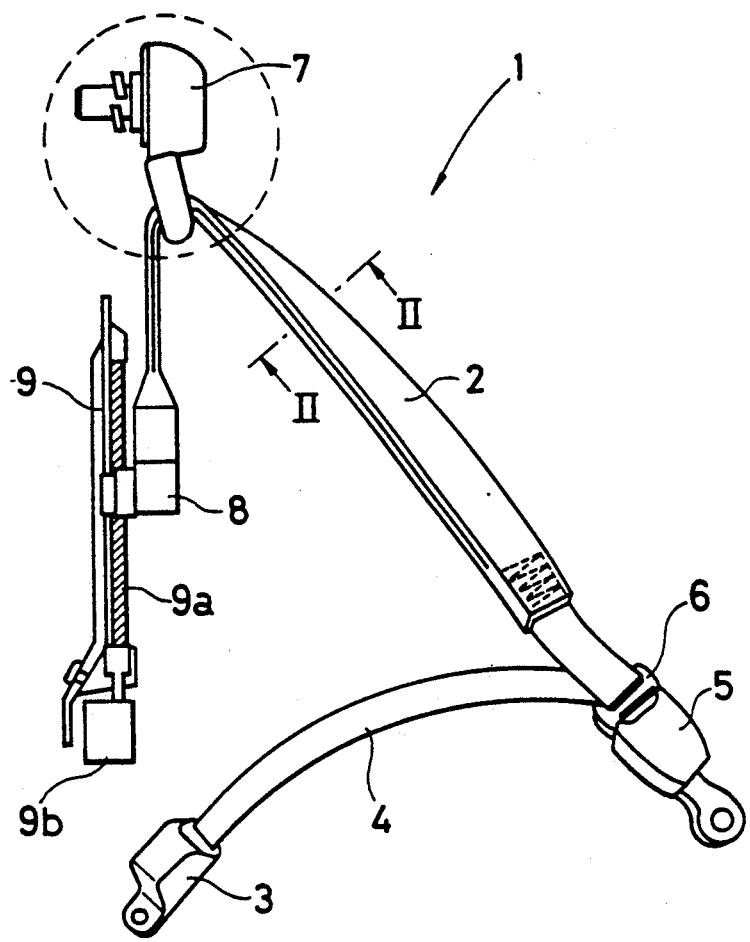
FIG. 1 is a schematic view showing the overall construction of an inflatable seat belt apparatus according to an embodiment of the present invention.

As shown in FIG. 1, an inflatable seat belt apparatus 1 according to this embodiment includes a shoulder belt 2 extending from a left or right side (the right side of the passenger in the illustrated example) and formed into a bag-shaped configuration, a lap belt 4, similar to which is common seat belt of the prior art, one end of which is connected to one end of the shoulder belt 2 and the other end of which is connected to a seat belt retractor (ELR) 3 secured to the floor of the vehicle body on the same side as the shoulder belt 2, a prescribed amount of the lap belt 4 being wound upon the retractor 3, a buckle device 5 fastened to the floor of the vehicle body on the side opposite the seat belt retractor 3, a tongue 6 inserted into and locked with the buckle device 5 when the seat belt is fastened, an intermediate guide 7 which guides the shoulder belt 2, a gas generator (G.G.) 8 actuated in the event of an emergency such as a vehicular collision to generate a reaction gas introduced to the interior of the bag-shaped shoulder bag 2, and an adjuster device 9 for adjusting the position of the gas generator 8 up or down.

Figure 2:
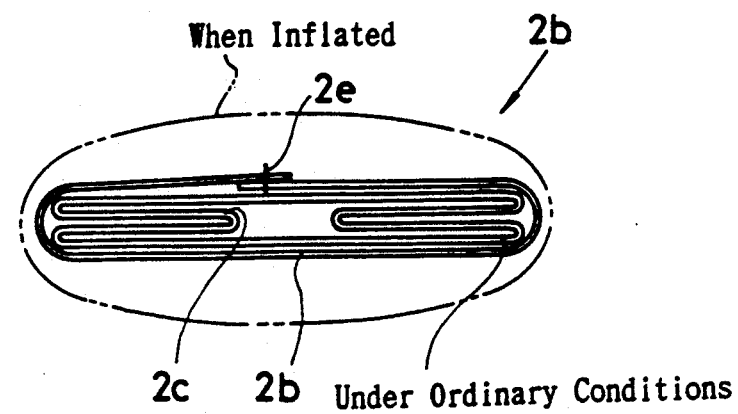
FIG. 2 is a sectional view taken along line II—II of FIG. 1.

As indicated by the solid lines in FIG. 2, the shoulder belt 2 has a belt main body 2c folded up and covered as by a cover 2d, both ends of which are sewn together at 2e, whereby the belt-shaped form is maintained when ordinary conditions prevail. The cover 2d is so designed that when the reaction gas is introduced from the gas generator 8, the sewn portion 2e readily separates under the expansion force of the shoulder belt 2 and does not interfere with the inflation of the shoulder belt 2. At this time the shoulder belt 2 reliably expands as indicated by the two-dot chain line in FIG. 2. The portion at which the shoulder belt 2 and lap belt 4 are connected and the connection between the shoulder belt 2 and gas generator 8 are maintained in an air-tight state.

Figure 3:
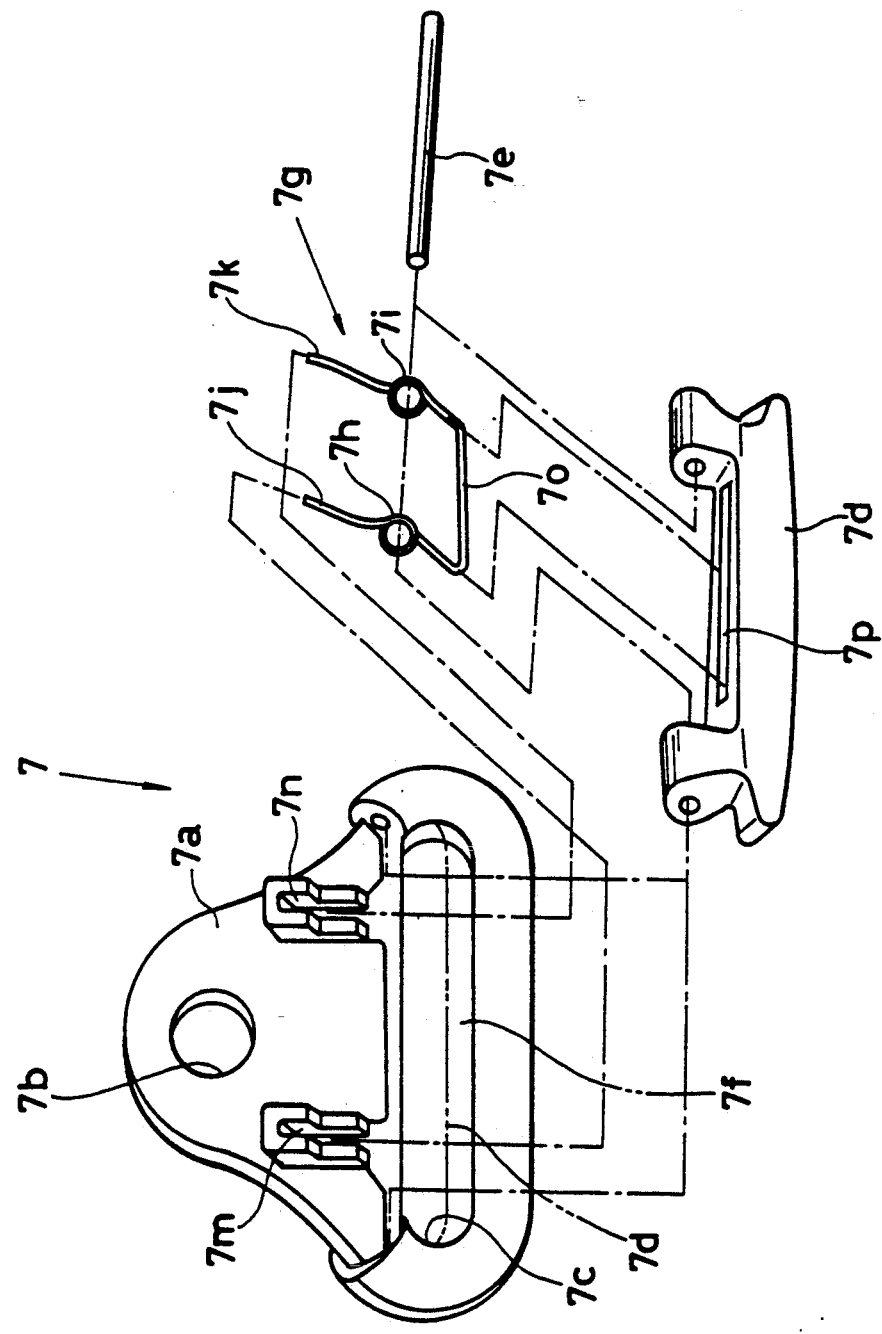
FIG. 3 is an exploded perspective view of an intermediate guide according to the embodiment.

The intermediate guide 7 has a main body 7a, as illustrated in FIG. 3. The main body 7a has a mounting hole 7b through which is passed a fixing member such as a screw or bolt for mounting the intermediate guide on the vehicle body, and a through-hole 7c through which the shoulder belt 2 passed in a freely movable manner. The size of the through-hole 7c is set to allow sufficient expansion of the shoulder belt 2, as indicated by the two-dot chain line in FIG. 2.

A movable lever 7d is turnably attached to the main body 7a by a lever pin 7e. The movable lever 7d is designed to have a size which will close part of the through-hole 7c when the lever is in abutting contact with the main body 7a, thereby reducing the opening area of the through-hole 7c.

The movable member 7d is held in abutting contact with main body 7a at all times by the biasing force of a spring 7g. The spring 7g has a generally U-shaped configuration with ring portions 7h, 7i through which the lever pin 7e is passed. The spring 7g has two ends 7j, 7k that are fitted into mounting grooves 7m, 7n, respectively, provided in the main body 7a, and a middle portion 7o that is fitted into a hole 7p provided in the movable lever 7d. Thus, the movable lever 7d is held in contact with the main body 7a at all times by the biasing force of the spring 7g, whereby the opening area of the through-hole 7c ordinarily is minimal. The design is such that the opening area of an open portion 7f (FIG. 3) of the through-hole 7c at this time will allow smooth movement of the shoulder belt 2 through the hole 7c but will prevent the belt 2 from turning over or twisting.

The spring 7g is so designed that the magnitude of the spring force thereof will allow the movable lever 7d to readily turn in the direction of arrow under the expansion force in the folded portion of the shoulder belt 2 when the reaction gas expelled from the gas generator 8 flows into the shoulder belt 2 and causes expansion of the folded portions of the shoulder belt 2.

The adjuster device 9 comprises a vertically extending screw shaft 9a with which the gas generator 8 is threadedly engaged, and a motor 9b which turns the screw shaft 9a. Owing to rotation of the screw shaft 9a by the motor 9b, the gas generator 8, namely the other end of the shoulder belt 2, is moved up or down in dependence upon the direction of rotation, as a result of which slack in the shoulder belt 2 is capable of being taken up by an amount commensurate with the build of the seated passenger. Accordingly, the shoulder belt 2 and lap belt 4 can be fitted to the passenger properly by means of the adjuster device 9.

In the seat belt apparatus 1 of the embodiment constructed as described above, under ordinary conditions the shoulder belt 2 is maintained in the belt-shaped form and the through-hole opening-area control member 5d is held in the state in which it is in contact with the main body 5a, and the movable lever 7d is held in contact with the main body 7a, as shown in FIG. 4(a), thereby minimizing the opening area of the through-hole 7c. More specifically, the movable lever 7d is held at a position at which it reduces the opening area.

Under these conditions, the passenger sits down in the seat and inserts the tongue 6 into the buckle device 5 until it locks, thereby fastening the belt. If the shoulder belt 2 and lap belt 4 do not fit the passenger correctly at this time, the motor 9b of the adjuster device 9 is driven into operation to raise or lower the gas generator 8 and adjust the lengths of the two belts 2, 4 so that they will fit the passenger correctly. With the belt fastened in this manner, the lap belt 4 are biased under a weak force in the take-up direction, just as in an ordinary seat belt apparatus according to the prior art. However, the weak force does not subject the passenger to an oppressive sensation. In addition, since the take-up reel of the seat belt retractor 7 does not lock, the lap belt 4 can be pulled out freely.

When deceleration of a predetermined magnitude acts upon the vehicle while the vehicle is traveling, the passenger moves forward owing to an inertial force and the lap belt 4 attempts to pull out of the seat belt retractor 3. However, a deceleration sensor provided in the seat belt retractor 3 is actuated at this time and causes the take-up reel to lock, as a result of which the lap belt 4 is prevented from pulling out. Accordingly, the passenger is reliably restrained by the shoulder belt 2 and lap belt 4 and is prevented from being thrust forward. In this case the shoulder belt 2 contacts the passenger at the correct position owing to the intermediate guide 7. Thus, under ordinary conditions the inflatable seat belt apparatus 1 of this embodiment exhibits a passenger-restraining function similar to that of the ordinary seat belt apparatus according to the prior art.

Moreover, part of the impact load developed by the shoulder belt 2 when the passenger contacts the shoulder belt 2 is supported by the intermediate guide 7, and therefore, the load which acts upon the connection between the shoulder belt 2 and the gas generator 8 is reduced.

In the event of an emergency when a very large deceleration acts upon the vehicle, as when a vehicular collision occurs, a deceleration sensor provided in the vehicle is actuated and causes the gas generator 8 to generate a high-pressure gas. As shown in FIG. 4(b), the generated gas flows instantaneously into portion 2a of the shoulder belt between the gas generator 8 and intermediate guide 7, thereby dislodging the cover 2d and causing the portion 2a to inflate. The gas which has penetrated the portion 2a of shoulder belt 2 urges the movable lever 7d of the intermediate guide 7 in the direction of arrow α via the portion 2a that has been inflated. As a result, the movable lever 7d is turned about the lever pin 7e in the direction of arrow β against the biasing force of the spring 7g.

As shown in FIG. 4(c), the movable lever 7d is moved to a position at which the opening area of the through-hole 7c of intermediate guide 7 is enlarged. At this position of the movable lever 7d, the opening area of the through-hole 7c is enlarged so that the gas may readily penetrate the shoulder belt portion 2b from the intermediate guide 7 onward, namely the portion of the belt in contact with the passenger. Thus the shoulder belt portion 2b also expands substantially instantaneously and in reliable fashion.

Accordingly, the passenger is reliably restrained by the inflated shoulder belt portion 2b. As a result, the shoulder belt portion 2b broadens so that the kinetic energy of the passenger is borne over a wide area. The load, therefore is dissipated so that the passenger is protected against large impact loads in a reliable manner. In addition, slack in the shoulder belt 2 is taken up owing to expansion, as a result of which the passenger-restraining performance of the belt is improved. Moreover, since the gas readily flows into shoulder belt portion 2b ahead of the intermediate guide 7, the heat of the gas which acts upon the connecting portion between the shoulder belt 2 and the gas generator 8 is reduced.

The present invention is not limited to the foregoing embodiment but can be modified in various ways. For example, in the foregoing embodiment, the arrangement is such that the movable lever 7d of the intermediate guide 7 is biased into contact with the main body 7a of intermediate guide 7 by the spring 7g at all times. However, it is permissible to adopt an arrangement in which either the main body 7a or movable lever 7d is provided with a small projection and the member which does not have the small projection is made to constantly engage the small projection under a prescribed weak force, whereby the movable lever 7d is held at a position at which it abuts against the main body 7 to minimize the opening area of the through-hole 7c in the intermediate guide 7. When the gas is generated, this engagement is overcome so that the movable lever 7d is turned to enlarge the opening area of the through-hole 7c.

Further, the method of maintaining the shoulder belt 2 is the belt-shaped form is not limited to that shown in FIG. 2. Any method can be employed, such as that adopted in the prior art.

Thus, in accordance with the inflatable seat belt apparatus of the present invention, as described in detail above, the opening area of the through-hole in the intermediate guide is made small under ordinary conditions, thereby making it possible to reliably prevent the webbing from turning over and twisting and assuring that the passenger can be restrained at the correct position. Thus, when conditions are normal, the inflatable seat belt apparatus performs a function similar to that of the common seat belt apparatus of the prior art.

In the event of an emergency, the opening area of the through-hole in the intermediate guide is enlarged so that the gas can readily penetrate the bag-shaped portion of the webbing. Therefore, even though the intermediate guide is provided, the webbing can be inflated instantaneously and in reliable fashion. Accordingly, the kinetic energy of the passenger is borne over a wide area so that the passenger is protected from large impact loads much more reliably. Moreover, owing to the fact that the webbing expands, slackness in the webbing can be absorbed to improve even further the passenger restraining performance of the inflatable seat belt apparatus.

As many apparently widely different embodiments of the present invention can be made without departing from the spirit and scope thereof, it is to be understood that the invention is not limited to the specific embodiments thereof except as defined in the appended claims.

What is claimed is:

1. An inflatable seat belt apparatus, comprising:
   a webbing, at least part of a portion which comes into contact with a passenger is formed into a bag-shape, wherein the webbing is maintained in a belt-shape form during initial conditions and the bag-shape portion is inflated by gas from gas generating means at the time of vehicle collision;
   a tongue provided on said webbing which is insertable into and lockable with a buckle to make possible restraint of the passenger;
   an intermediate guide, which has a through-hole through which the webbing is passed, for guiding said webbing through the through-hole in a freely movable manner;
   a through-hole opening-area control member movably provided on said intermediate guide and being movable between an opening-area reducing position and an opening-area enlarging position, said control member being held at said opening-area reducing position under initial conditions and being moved to said opening-area enlarging position in the event of a vehicle collision;
   wherein when said control member is at said opening-area reducing position, an opening area of the through-hole is defined at least in part by said control member to be a first size which allows movement of said webbing therethrough while said webbing is maintained in the belt-shape form, but which will impede turning over and twisting of said webbing, and when said control member is at said opening-area enlarging position, said opening-area of the through-hole is defined at least in part by said control member to be a second size which is larger than said first size and which is sufficient to allow gas to readily penetrate the bag-shape portion; and
   said control member remaining in said opening-area reducing position even during movement of said webbing through said through-hole and moving to said opening-area enlarging position when said bag-shape portion is inflated with gas from the gas generating means.

2. The apparatus according to claim 1, wherein said control member comprises a movable lever, said lever being biased toward said opening-area reducing position by a spring at all times.

3. The apparatus according to claim 1 or 2, wherein an end of the bag-shaped portion of said webbing is connected to said gas generating means, and adjusting means is provided for adjusting position of said gas generating means up and down.

4. An inflatable seat belt apparatus, comprising:
   a webbing, at least a portion which comes into contact with a passenger is formed into a bag-shape;
   means for maintaining the webbing in a belt-shape form during initial conditions and for allowing inflation of the bag-shape portion by gas from a gas generating means at the time of a vehicle collision;
   a tongue provided on said webbing which is insertable into and lockable with a buckle to make possible restraint of the passenger;
   an intermediate guide, which has a through-hole through which the webbing is passed, for guiding said webbing through the through-hole in a freely movable manner;
   a through-hole opening-area control member movably provided on said intermediate guide and being movable between an opening-area reducing position and an opening-area enlarging position;
   means for holding said control member at said opening-area reducing position under initial conditions even during movement of said webbing through said through-hole and for moving said control member to said opening-area enlarging position when said bag-shape portion is inflated with gas from the gas generating means at the time of a vehicle collision;
   wherein when said control member is at said opening-area reducing position, an opening area of the through-hole is defined at least in part by said control member to be a first size which allows movement of said webbing therethrough while said webbing is maintained in the belt-shape form, but which will impede turning over and twisting of said webbing, and when said control member is at said opening-area enlarging position, said opening-area of the through-hole is defined at least in part by said control member to be a second size which is larger than said first size and which is sufficient to allow gas to readily penetrate the bag-shape portion.

5. An inflatable seat belt apparatus according to claim 1 or 4, wherein an end of the bag-shape portion of said webbing, of which at least a part is brought into contact with the occupant, is passed through the through-hole of said intermediate guide and is connected to the gas generating means;
   a displacing and fixing means is connected to said gas generating means for making said gas generating means displaceable in a longitudinal direction of said webbing and for displacing and driving said gas generating means toward a desired position in the longitudinal direction of said webbing and for fixing and maintaining said gas generating means at said desired position.

6. An inflatable seat belt apparatus according to claim 5, wherein said displacing and fixing means comprises;
   a rotatable screw body arranged in the longitudinal direction of said webbing; and
   a driving means for rotating said screw body;
   said gas generating means being screwed in and fixed by said screw body; and
   said screw body is rotated by driving of said driving means, said gas generating means is displaced and fixed at the desired position, and slackening of said webbing is finely adjusted corresponding to physical size of the seated occupant.

* * * * *